US009615375B2

(12) United States Patent
Thill et al.

(10) Patent No.: US 9,615,375 B2
(45) Date of Patent: Apr. 4, 2017

(54) SYSTEM AND METHOD FOR COMMUNICATION RESOURCE ALLOCATION

(71) Applicant: THALES, Neuilly sur Seine (FR)

(72) Inventors: Jean-Claude Thill, Gennevilliers (FR); Fabien Verhaeghe, Gennevilliers (FR); Isabelle Herbin, Gennevilliers (FR); Raphael Massin, Gennevilliers (FR); Gilles Monzat De Saint Julien, Gennevilliers (FR); Catherine Lamy-Bergot, Gennevilliers (FR)

(73) Assignee: Thales, Courbevoie (FR)

( * ) Notice: Subject to any disclaimer, the term of this patent is extended or adjusted under 35 U.S.C. 154(b) by 214 days.

(21) Appl. No.: 14/376,838

(22) PCT Filed: Feb. 14, 2013

(86) PCT No.: PCT/EP2013/053028
§ 371 (c)(1),
(2) Date: Aug. 5, 2014

(87) PCT Pub. No.: WO2013/120975
PCT Pub. Date: Aug. 22, 2013

(65) Prior Publication Data
US 2015/0016409 A1   Jan. 15, 2015

(30) Foreign Application Priority Data
Feb. 16, 2012 (FR) ...................................... 12 00441

(51) Int. Cl.
*H04W 72/04* (2009.01)
*H04W 72/10* (2009.01)
(Continued)

(52) U.S. Cl.
CPC ....... *H04W 72/10* (2013.01); *H04W 72/0446* (2013.01); *H04W 4/08* (2013.01); *H04W 84/18* (2013.01)

(58) Field of Classification Search
None
See application file for complete search history.

(56) References Cited

U.S. PATENT DOCUMENTS

| 2007/0005292 A1* | 1/2007 | Jin ........................ G01S 5/0289 702/150 |
| 2010/0074133 A1* | 3/2010 | Kim ....................... G01S 5/0289 370/252 |
| 2012/0064935 A1* | 3/2012 | Hakola .................. H04W 72/02 455/513 |

OTHER PUBLICATIONS

Fabien Esmiol, Stephane Rousseau, Vanla Conan, Christian Bonnet, Distributed Multi-Level Cooperative Scheme for QoS Support in Public Saftey Networks, Thales Communications, Sep. 2011.*
Fabien Esmiol, et al, "Distributed Multi-Level Cooperative Scheme for QoS Support in Public Safety Networks", 2011 IEEE 8th International Conference on Mobile Adhoc and Sensor Systems, Oct. 17, 2011, pp. 955-961, XP032021963.
Chunhung Richard Lin, et al, "Adaptive Clustering for Mobile Wireless Networks", IEEE Journal on Selected Areas in Communications, Sep. 1, 1997, pp. 1265-1275, vol. 15, No. 7, IEEE Service Center, Piscataway, NJ, USA, XP011054691.
(Continued)

*Primary Examiner* — Hassan Phillips
*Assistant Examiner* — Ayanah George
(74) *Attorney, Agent, or Firm* — Baker Hostetler LLP

(57) ABSTRACT

A system and method for communication resource allocation, a resource including a time slot and at least one associated channel, said channel including at least one transmit and/or receive frequency usable during said time slot, in a mobile meshed network including a first set of radio transceivers communicating with one another via radio links, at least one group, comprising a second set of at least one radio transceiver of said first set, said second set including a master transceiver in a master/subordinate relationship with all the radio transceivers of the second set, a central radio transceiver of the network belonging to said first set. Said system is characterized in that it comprises first means for determining said group(s), second means for
(Continued)

allocating all or some of said resources through assignment of a resource to a single group which is able to use said resource for one or more communications between radio transceivers of said group; or through allocation of a resource to a single first group which is able to use said resource for communication between radio transceivers of said first group and radio transceivers belonging to one or more neighboring destination groups, if none of the other resources sharing the same time slot with said resource is determined as belonging to one of said destination groups or to a different second group for links to one of said destination groups of the first group, except if the first group and the second group have no transceiver having a common radio neighbor in the destination groups. Finally, said system comprises third means for allocating, for all or some of the groups, all or some of the resources allocated to said group, to one of the radio transceivers in the group.

6 Claims, 5 Drawing Sheets

(51) Int. Cl.
    *H04W 84/18*     (2009.01)
    *H04W 4/08*     (2009.01)

(56) References Cited

OTHER PUBLICATIONS

T. Clausen, et al, "Optimized Link State Routing Protocol (OLSR)", IEFT-RFC 3626, Oct. 2003, pp. 1-75.

Mario Gerla, et al., "Multicluster, Mobile, Multimedia Radio Network", Wireless Networks, Jul. 1995, pp. 255-265, vol. 1, J.C. Baltzer AG.

Ching-Chuan Chiang, et al., Routing in Clustered Multihop, Mobile Wireless Networks with Fading Channel, ICCS/ISPACS, Nov. 1996, pp. 1-15.

\* cited by examiner

SYSTEM AND METHOD FOR COMMUNICATION RESOURCE ALLOCATION

CROSS-REFERENCE TO RELATED APPLICATIONS

This application is a National Stage of International patent application PCT/EP2013/053028, filed on Feb. 14, 2013, which claims priority to foreign French patent application No. FR 1200441, filed on Feb. 16, 2012, the disclosures of which are incorporated by reference in their entirety.

FIELD OF THE INVENTION

The present invention relates to the field of mobile and meshed communications networks, for example mobile ad hoc networks. Networks of this type comprise a plurality of radio transceivers interconnected via radio links. These radio transceivers are, for example, a computer terminal equipped with a Wi-Fi Link, a portable telephone or any other wireless communication device, but they may also be a mobile vehicle with an on-board wireless communication device. These radio transceivers are also known as nodes in the prior art.

The invention relates more precisely to resource allocation, a resource being defined as a time slot, and at least one associated channel, said channel being at least one transmit/receive frequency allowing one of more communications in the mobile network. An example of these resources is shown in FIG. 1. The resource allocation is implemented in particular by using "Time Division Multiple Access" (TDMA) or Frequency Division Multiple Access (FDMA).

BACKGROUND

The mobile and meshed communications network comprises radio transceivers distributed in different groups, these groups also being referred to as clusters in the prior art. An example of a mobile radio network is shown in FIG. 2. Each group has a group master transceiver, and one of the transceivers is defined as being the central transceiver of the network. The groups are defined by adhering to the following rules:

Each radio transceiver is either a group master transceiver of the group (CH) or a subordinate transceiver of the group (CM).
The subordinate transceivers are all within the radio range of the master transceiver (CH).
Each radio transceiver belongs to one group only.
The master transceivers (CH) are not radio neighbors.
The central radio transceiver may be any one of the radio transceivers.
Two transceivers are neighboring if they are within radio range.
Two groups A and B are referred to as neighbors if at least one transceiver of one group is a neighbor to a transceiver of the other group.
Two groups A and B are close neighbors if at least one of the following conditions is verified:
  They are neighbors
  There is at least one radio transceiver in group A and one radio transceiver in group B that have a common neighbor in another group.
An example of these different conditions is shown in FIG. 3. FIG. 4 shows a situation in which the groups A and C are not neighbors.

Devices for determining the different groups, the group master transceivers and the central transceiver of the network are described in the prior art, for example, in the following documents:

Recommendation IETF RFC number 3626 on OLSR (Optimized Link State Routing Protocol), drawn up by T. Clausen and P. Jacquet
the article by M. Gerla and J. T.-C. Tsai entitled "Mutli-cluster, mobile, multimedia radio network", published in "Journal of Wireless Networks, 1(3): 255-265, July 1995"
the article by Chiang, H. WU, W. Liu and M. Gerla entitled "Routing in clustered multihop, mobile wireless networks with fading channel", published during the ICCS/ISPACS'96 conference held in Singapore in November 1996

The object of the invention is therefore to allocate resources dynamically to the radio transceivers in such a way as to ensure the transmission of these radio transceivers to one or more of the neighboring radio transceivers, by avoiding allocation conflicts (for example resulting from the fact that a radio transceiver cannot transmit and receive simultaneously). The object of the invention is also to avoid interference between the radio transceivers. This allocation therefore requires a complex coordination between the radio transceivers. This allocation may also depend on the communication requirement of the different radio transceivers. In order to respond to changes in the organization of the groups and in the resource requirements of the radio transceivers, it is necessary to have a system enabling continuous modification of the allocations.

A solution is known in the prior art in which the mobile communications network is not organized into a set of groups. The allocation depends on the transmission type concerned: broadcast transmission to all of the neighboring radio receivers, point-to-point transmission (from one radio transceiver to a neighboring radio transceiver) and, more generally, from one radio transceiver to all or some of the neighboring radio transceivers. The allocation to avoid conflicts must take account of a certain number of rules, for example not allocating the same time slot to different transmissions which involve common radio transceivers. Another rule is not to allocate transmissions on the same channel of a time slot if that involves interference. This type of distributed negotiation is slow. The quantity of resources to be allocated depends on the traffic requirement of the radio transceiver, and therefore if the reactivity is low, situations may arise in which the resources allocated to a radio transceiver may be insufficient, whereas those allocated to a different radio transceiver are excessive.

Systems are also known which enable resource allocation in a mobile communications network, but only between radio transceivers of the same group. The allocation of the resources used for communications between radio transceivers belonging to two different groups is carried out by using Code Division Multiple Access (CDMA). However, this type of resource allocation in a mobile meshed communications network is not efficient, in fact the interferences due to the near-far effect are not suppressible in this type of network.

Another solution known in the prior art is to use a resource allocation system equivalent to that used in a cellular network. In this case, it is considered that the access points are the group master transceivers and the users are the radio transceivers. However, in these systems, only the transmissions from a radio transceiver to the access point (group master transceiver) are taken into account. These systems do not allow resource allocation for direct transmissions between a radio transceiver and one or more neighboring radio transceivers. Furthermore, the resource allocations for the transmissions between radio transceivers belonging to different groups or communications between two master transceivers cannot be implemented by these systems. In fact, in cellular networks, communications between transceivers of different groups are routed via an interconnection network independent from the access points (group master transceivers) and it is not therefore necessary to carry out the resource allocation. In the case where small access points, known as femto cells, are used, systems are known for allocation of resources between these access points, but this type of allocation does not allow the allocation of resources for direct communication between two transceivers.

SUMMARY OF THE INVENTION

The present invention aims notably to solve these problems by proposing a system and a method for resource allocation in a mobile and meshed communications network, enabling a resource allocation for the communications between radio transceivers belonging to different groups and minimizing the exchanges, necessary for the allocation of these resources, between the different radio transceivers of the mobile and meshed communications network.

According to one aspect of the invention, a communication resource allocation system is proposed, a resource including a time slot and at least one associated channel, said channel including at least one transmit and/or receive frequency usable during said time slot, in a mobile meshed network including a first set of radio transceivers communicating with one another via radio links, at least one group, comprising a second set of at least one radio transceiver of said first set, said second set including a master transceiver in a master/subordinate relationship with all of the radio transceivers of the second set. Said mobile meshed network also includes a central radio transceiver of the network belonging to said first set. Said system is characterized in that it comprises first means for determining said group(s), second means for allocating all or some of said resources through assignment of a resource to a single group which is able to use said resource for one or more communications between radio transceivers of said group; or through allocation of a resource to a single first group which is able to use said resource for communication between radio transceivers of said first group and radio transceivers belonging to one or more neighboring destination groups, if none of the other resources sharing the same time slot with said resource is determined as belonging to one of said destination groups or to a different second group for links to one of said destination groups of the first group, except if the first group and the second group have no transceiver having a common radio neighbor in the destination groups. Said system also comprises third means for allocating, for all or some of the groups, all or some of the resources allocated to said group, to one of the radio transceivers in the group.

The system therefore allows an allocation of the resources of the mobile and meshed communications network, minimizing the implementation time of this allocation and the messages exchanged to implement this allocation.

According to one embodiment, said second means are furthermore suitable for initializing a priority index associated with each of said groups on the basis of the number of radio transceivers belonging to the group, the number of radio transceivers belonging to neighboring groups and the requirements for resources necessary for the radio transceivers belonging to the group. Said second means are suitable for assigning a resource to the group having the lowest priority index and being able to use said resource for communication between radio transceivers of said group, or for assigning a resource to the first group having the lowest priority index and being able to use said resource for communication between radio transceivers of said group and radio transceivers belonging to one or more neighboring destination groups, if none of the other resources sharing the same time slot with said resource is determined as belonging to one of the neighboring groups or to a different second group for links to one of said destination groups of the first group, except possibly if said first group and said second group have no transceiver having a common radio neighbor belonging to one of the destination groups and updating of the priority index following a resource assignment.

This technical characteristic allows an allocation of the resources to be carried out in such a way as to maximize the resources allocated to the groups having the greatest resource requirement. The groups having the greatest resource requirement are the groups having a large number of radio transceivers in the group, a large number of neighbors or for which the radio transceivers in the group exchange a substantial quantity of data.

According to one embodiment, said first determination means are furthermore suitable for determining said central radio transceiver, said system furthermore comprising fourth means, associated with a group, for transmission of the necessary resources by all or some of the radio transceivers in the group to the group master transceiver, for concatenation of the necessary resources by all of the radio receivers belonging to the group and for transmission of the necessary concatenated resources to the central radio transceiver, and fifth resources associated with a group, for transmission of the resources assigned by the second means to the group master transceiver and for transmission of the resources assigned by the third means to the radio transceivers in the group.

This technical characteristic enables the management of a centralized resource allocation system in which the central radio enables the resources to be allocated between the different groups and the group master radios enable the resources to be allocated between the different radio transceivers which are members of the group.

According to one embodiment, the second means and/or the third means are suitable for dividing the time slots into time sub-slots and for assigning the time sub-slots to radio transceivers which may be different or groups which may be different.

This technical characteristic enables improvement of the resource allocation for the transmission of data requiring a low rate and a low latency. These data are, for example, real-time data or signaling data.

According to one embodiment, said system furthermore includes sixth means, for all or some of the radio transceivers and groups, for storing an authorization of use by the radio transceiver or by the group of all or some of the available resources.

This technical characteristic allows a situation to be managed in which a network is split into two independent networks and interference between the independent networks to be avoided.

Advantageously, the communication resource allocation method, a resource including a time slot and at least one associated channel, said channel including at least one transmit or receive frequency usable during said time slot, in a mobile meshed network including a first set of radio transceivers communicating with one another via radio links, at least one group, comprising a second set of at least one radio transceiver of said first set, said second set including a master transceiver in a master/subordinate relationship with all the radio transceivers, a central radio transceiver of the network belonging to said first set, said method been characterized in that it comprises a step of determining said group(s), a second step of allocating all or some of said resources through allocation of a resource to a single group which can use said resource for one or more communications between radio transceivers of said group; or through assignment of a resource to a single first group which can use said resource for communication between radio transceivers of said first group and radio transceivers belonging to one or more neighboring destination groups, if none of the other resources sharing the same time slot with said resource is determined as belonging to one of said destination groups, or to a different second group for links to one of said destination groups of the first group, except if the first group and the second group have no transceiver having a common radio neighbor in the destination groups, and a third step of allocating, for all or some of the groups, all or some of the resources allocated to said group, by the group master transceiver to one of the radio transceivers in the group.

BRIEF DESCRIPTION OF THE DRAWINGS

The invention will be better understood and other advantages will become evident from a reading of the detailed description given by way of a non-limiting example and with the aid of the figures, in which.

DETAILED DESCRIPTION

The invention is implemented in a mobile and meshed communications network having a dynamic organization. This organization allows radio transceivers to be combined into a plurality of groups. Each group includes a set of radio transceivers and, among these radio transceivers, one of the radio transceivers is designated to be the group master transceiver. Each radio transceiver belongs to a single group. Moreover, among the radio transceivers of the entire network, one of the radio transceivers is designated to be the central transceiver of the network.

The transmission requirements of the transceivers in the network can be translated into a transmission requirement within the group and between neighboring groups. The type of transmission between groups generally involves a source group S and one or more neighboring destination groups D1, D2, D3.

The transmissions taking place in the network are of the following types:

Communications from one radio transceiver of one group to one or more radio transceivers of the same group. These communications are also referred to as intra communication.

Communications from one radio receiver of one group to one or more radio receivers of a different group. These publications are also called point-to-point inter communication.

Communications from one transceiver of one group to the transceivers of neighboring groups, referred to as broadcast inter communications Communication from one radio transceiver of one group to all neighboring radio transceivers, regardless of whether or not they belong to the same group. These communications are also called broadcast communications.

Figure 1:
FIG. 1 shows the definition of the resources
Figure 2:
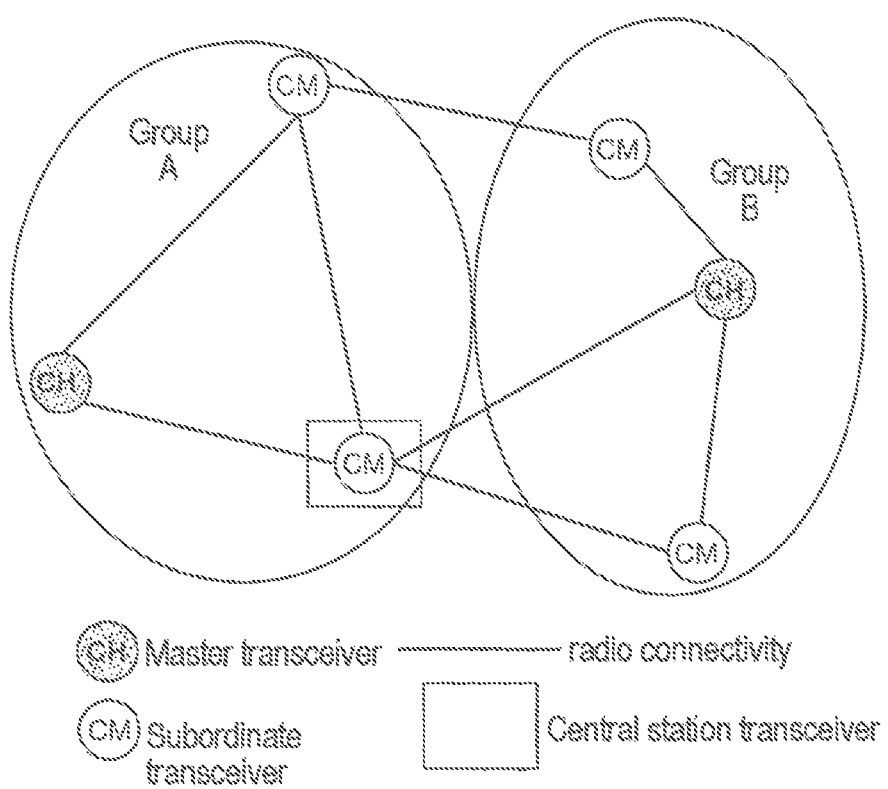
FIG. 2 shows the definition of the mobile and meshed communications network
Figure 3:
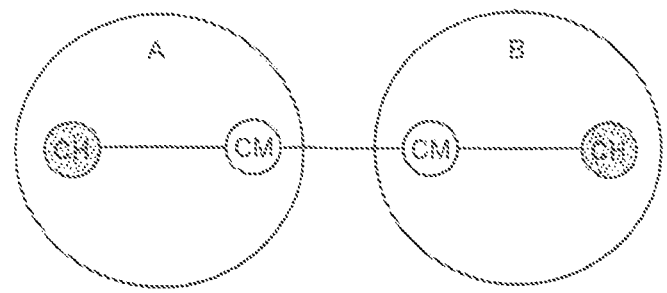
FIG. 3 shows an example of groups which are neighbors
Figure 3:
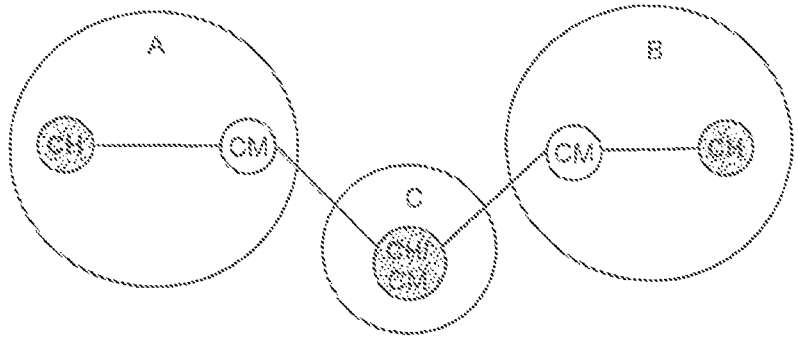
Figure 4:
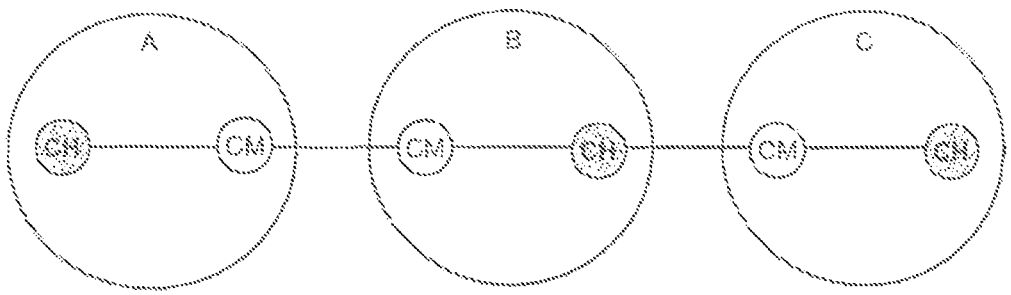
FIG. 4 shows an example of groups which are not neighbors
Figure 5:
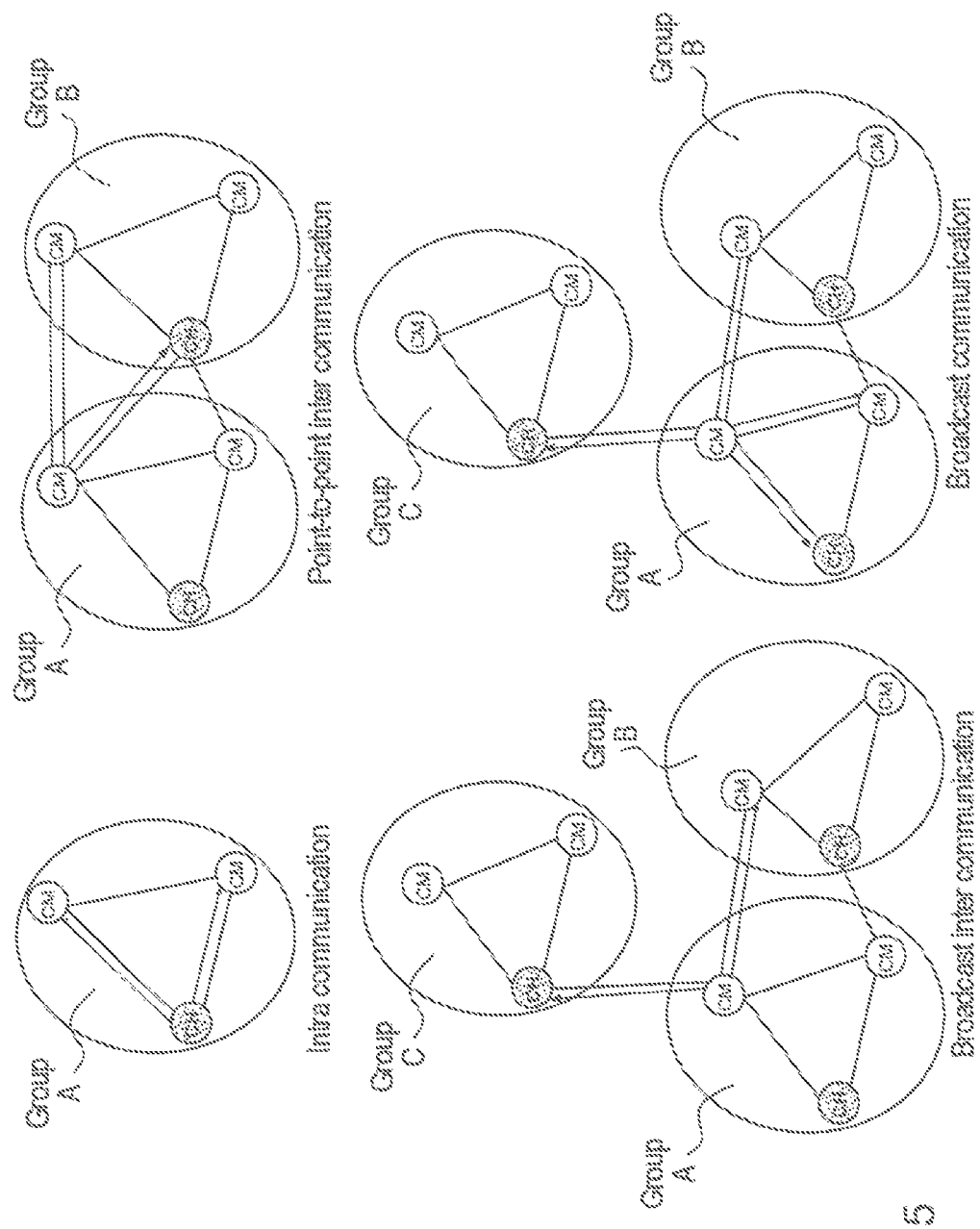
FIG. 5 shows the difference between the different types of communications

FIG. 5 shows the difference between these different types of communication.

Figures 6, 8:
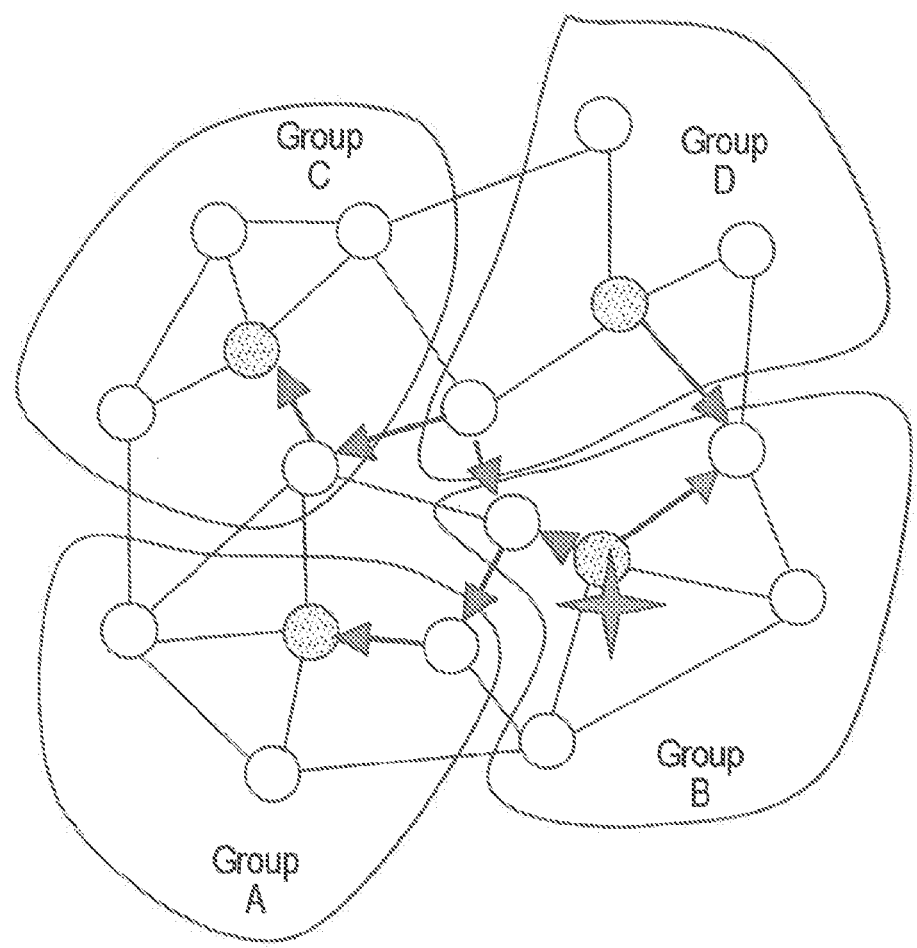
FIG. 6 shows a first embodiment of the system according to one aspect of the invention
FIG. 8 shows an example of resource allocation in a meshed mobile communications network

The system as shown in FIG. 6 comprises a first device 101 for determining the group(s). This device will therefore enable determination of the topology of the network, which will be used by the following devices.

The system also comprises a second device 102 for allocating resources to the different types of communications of the groups. This allocation is determined on the basis of topological considerations and the communication requirements expressed by the transceivers. The requirements of each transceiver in a group are organized and combined according to the type (i.e. intra, broadcast inter, point-to-point inter or broadcast) by the group master and are then transmitted to the central transceiver. The allocation is carried out furthermore in compliance with the constraints regarding neighboring between the different radio transceivers. This allocation is carried out in compliance with the following rules:

In general, no allocation on the same time slot between two types of group communications if the source group of one of the types is in the destination groups of the other.

In general, no allocation on the same time slot between two types of group communications if the group communications include common destination groups.

However, the two preceding rules may not be applied if the transceivers involved are separate. Thus, if two groups A and B are not close neighbors, the communications A to Di and B to Di can use the same time slot, even if the group communications have common destination groups.

As a result of the preceding rules, there is no allocation on the same time slot of a resource used for an inter communication of a group A and an intra or inter resource of a group B if the two groups are neighbors.

No multiple allocation of the same resource in the network.

The allocation is therefore carried out through assignment of a resource to a single group which can use said resource for one or more communications between radio transceivers of said group, if none of the other resources sharing the same time slot with said resource is determined as belonging to the group; or through assignment of a resource to a single group A which is able to use said resource for communication between radio transceivers of said group A and radio transceivers belonging to one or more neighboring destination groups, if none of the other resources sharing the same time slot with said resource is determined as belonging to one of said destination groups, or to a different group B for links to one of said destination groups of group A, except possibly if the group A and the group B have no transceiver having a common radio neighbor in the destination groups.

These rules enable resolution of cases of conflict and decision independence in the use of the resources between group masters. In other words, in the phase of allocation of resources to the members of the group, each group master can assign the resources to the subordinates of its group without having to liaise with the other group masters. This mechanism can be distributed over all or some of the radio transceivers of the network or can be implemented by the central transceiver. This central transceiver is chosen dynamically in such a way as to minimize the greatest distance in the number of radio hops between the central receiver and the group masters. This enables minimization of the signaling flows and allocation times, which are directly proportional to this distance. In one embodiment, this allocation is implemented in the following way by considering only intra and broadcast group communications:

The second allocation device uses on input a set of requests representing the resource requirements of each group. Each resource requirement is characterized by:
  The communication type, intra-group communication or inter-group communication
  A weighting which characterizes the criticality of the request
  The group with which this resource requirement is associated.
A set of variables characterizing the topology is associated with each group, determined in the following manner:
  A variable characterizing the intra topology, the weighting of which is a function of the ratio of the number of radio transceivers in the group to the total number of radio transceivers in the network.
  A variable characterizing the inter topology, the weighting of which is a function of the ratio of the number of 1-hop and 2-hop neighbors of the group and the total sum of the number of 1-hop and 2-hop neighbors of all the groups in the network.
  1-hop and 2-hop neighboring is understood to mean all the radio transceivers not belonging to this group and being 1-hop or 2-hop neighbors of at least one radio transmitter in the group.
  A transceiver is said to be a 2-hop neighbor of a different transceiver if they are not 1-hop neighbors and if they have at least one common neighboring transceiver.

The allocation device 102 then considers each available resource in a sequential manner. The resource concerned is assigned to the resource requirement, authorized with regard to the rules expressed above and having the highest weighting. The weighting of this resource requirement is then reduced and the device then processes the following available resource.

An example of a result of an allocation by the central transmitter is given in the table below. It corresponds to the network shown in FIG. 8:

In the table above, CT denotes the time slot, xA denotes the allocation of the resource to group x for intra communications, xR denotes the allocation of the resource to group x for inter communications.

It can be seen that only groups 2 and 3 are not neighbors. This is why the allocation device puts inter resources of group 3 with intra resources of group 2 (e.g. CT3) in the same time slot and vice versa (e.g. CT13). Conversely, this case does not arise for the other groups.

However, the allocator is able to put intra resources of different groups in the same time slot.

In one centralized embodiment, it is necessary that the first determination device 101 in the group(s) is moreover suitable for determining the central radio transceiver.

The system comprises a third device 103 enabling distribution of the resources allocated to a group between the different transceivers belonging to the group. In one embodiment, this allocation can be carried out in a distributed manner between all or some of the radio transceivers in the group. In another embodiment, this allocation can be carried out by the group master transceiver, this centralized implementation enabling limitation of the message exchanges and therefore the network load. This third allocation device uses only the immediate requirement, in a manner independent from the requirement which enabled the allocation of the resource to the group by the device 102. However, it is necessary to adhere to the assignment to the transmission types (intra-group communication or inter-group communication). In the case of a centralized allocation, the group master transceiver then broadcasts a description of the resource allocation to the transceivers in the group.

In one embodiment of the third device, each transceiver is characterized by a priority index, the value of which is, for example, N/D, where N is the number of time slots or resources already allocated to the transceiver and D is the number of allocations requested per second. For example, if 1 resource out of 10 is requested and each resource has a duration of 24 ms, then D=10/0.0240=4.17. The device then allocates the resources for the transceivers having the priority index with the highest priority. However, this resource allocated to the transceiver must be of a type compatible with the type determined by the second device 102.

In one embodiment, it is possible to reallocate a resource already allocated to a different transceiver. However, this reallocation must be carried out only if the priority index of the transceiver is lower than the priority index of the transceiver for which the resource is reallocated.

In one embodiment of the second allocation device 102, it is possible to define a priority index for each group on the basis of the number of radio transceivers belonging to the group of the number of radio transceivers belonging to neighboring groups and the resources necessary for the radio transceivers belonging to the group. This index will enable the second resource allocation device to choose the groups having the priority index with the highest priority. Then, when a resource is allocated to a group, the priority index of said group is updated. In one embodiment, this index may be

|  | CT1 | CT2 | CT3 | CT4 | CT5 | CT6 | CT7 | CT8 | CT9 | CT10 | CT11 | CT12 | CT13 |
|---|---|---|---|---|---|---|---|---|---|---|---|---|---|
| Channel 1 | 1A | 4R | 3R | 1R | 2R | 1A | 4R | 3R | 1R | 2R | 1A | 4R | 3R |
| Channel 2 | 4A |  | 2A |  | 3A | 4A |  | 2A |  | 3A | 4A |  | 2A |
| Channel 3 | 1A |  | 2A |  | 3A | 1A |  | 2A |  | 3A | 1A |  | 2A |
| Channel 4 | 4A |  |  |  |  | 4A |  |  |  |  | 4A |  |  |
| Channel 5 | 4A |  |  |  |  | 4A |  |  |  |  | 4A |  |  |

(T−t(j))/D(j), in which relation T is the current time, t(j) is the time of the last allocation to a group j and D(j) is the maximum desired period of time between the allocation of two resources. The device 102 will then allocate resources to the group j for which the relation (T−t(j))/D(j) is the maximum.

In one centralized embodiment, the second device 102 is contained in the central radio transceiver and the third device 103 is contained in the group master transceivers. This embodiment comprises a fourth device for transmission of the necessary resources by all or some of the transceivers in the group to the group master transceiver, for concatenation of the necessary resources by all the transceivers belonging to the group and for transmission of the necessary concatenated resources to the central radio transceiver. This embodiment further comprises a fifth device associated with a group, for transmission of the resources assigned by the second device 102 to the group master transceiver and for transmission of the resources assigned by the third device 103 to the transceivers in the group.

These devices use the transmission of four different types of signaling messages:

A message enabling the resource request, transmitted by each subordinate in the group to its master and containing the list of flows transmitted by this subordinate. Each flow is characterized by the source and destination addresses and a value which identifies the service contract itself characterized by a rate and a required latency, this value being able, for example, to use the field as defined by the acronym DSCP ("Differentiated Services Code Point").

A message enabling the transmission by the master of each group to the central radio transceiver and summarizing the requests received from its members. For each subordinate, the cluster master transmits a single request corresponding to the lowest of the latencies of the flows received from this member and the sum of the requests for rates of the flows received from this subordinate.

A message transmitted by the central radio receiver to all group masters and containing the list of the resources allocated to each group.

A message transmitted by each group master to its subordinates and containing a list of the resources allocated to each member.

In one centralized embodiment, it is necessary that the first device 101 for determining the group(s) is moreover suitable for determining the central radio transceiver.

Figure 7:
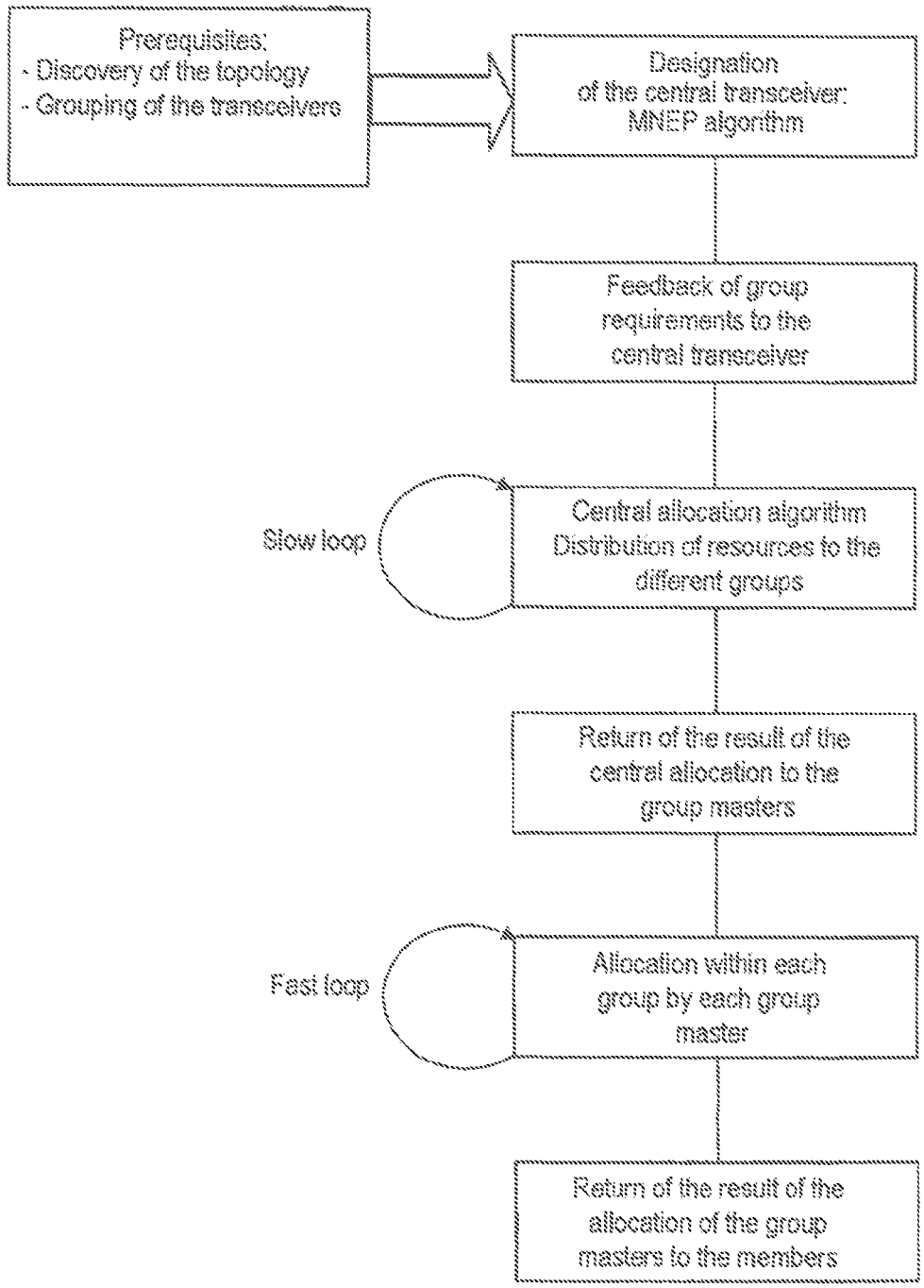
FIG. 7 shows a first embodiment of the method according to one aspect of the invention

FIG. 7 shows the different steps of the method according to one embodiment of the invention. This method comprises the following steps:

As a prerequisite, the system must know the topology of the network and must have proceeded with the grouping of the transceivers with designation of a master for each group. Recalling the references.

A step of designating the central transceiver. This designation can be carried out by means of the MNEP algorithm mentioned below.

A step of transmitting the requirements of the group master transceivers to the central transceiver.

A step of allocating the resources to the different groups by the central transceiver. An example embodiment of this algorithm is described below.

A step of transmitting the results of the central allocation to the group master transceivers.

A step of allocation by the group master transceivers. An example embodiment of this algorithm is described below.

A step of transmitting the result of the allocation by the group master transceivers to their group subordinate transceivers.

The method enabling the implementation of the determination of the central transceiver by designation is as follows:

The following definitions apply:

V is all the transceivers in the network.

E is all the radio links between the transceivers $\{x,y\}$ in the network, with $x \in V$ and $y \in V$ (non-oriented links)

$w(x,y)$ is the weighting associated with the link $(x,y)$. $w(x,y) > 0$.

$dist(x,y)$ is the distance between x and y with $x \in V$ and $y \in V$ which is calculated using an algorithm for calculating the shortest path between x and y.

$exc(x) = \max_{y \in V} dist(x,y)$: the eccentricity of a node $x \in V$.

$rad(G) = \min_{x \in G} exc(x)$ is the radius of the network.

$diam(G) = \max_{x \in G} exc(x)$ is the diameter of the network.

It is assumed that P is the set of the transceivers $x \in V$ such as $exc(x) = rad(G)$. P is the set of the nodes which are at the centre of the network.

The central transceiver is the transceiver $x \in P$ which has the highest degree, i.e. the greatest number of neighbors U. If the numbers are equal, the transceiver having the largest MAC address is chosen.

The method enabling the inter-group allocation is as follows. A cost function value is associated with each resource request. Slot(i) is assumed to be the number of the last time slot allocated to the request i. D(i) is assumed to be the recurrence required by the request i. At the time slot N, the cost function value of the request i is (N−slot(i))/D(i). The inter-group allocation principle entails allocation of the resources by groups of T time slots, by considering only the traffic time slots and by omitting the hybrid time slots therefrom, by fulfilling in a priority manner the resource requests having the highest cost function value. Since conflicts exist between some requests and since the number of available frequency channels associated with each time slot of a group of T time slots may be variable, the order in which the resources are allocated to the requests is not insignificant. For this reason, with each iteration of the algorithm on a group of T time slots, all permutations of the time slots of this group are evaluated. For each permutation, all the time slots are evaluated one by one, and the algorithm allocates the frequency channels to the requests by taking account of the conflicts that exist between them (two requests can share the same time slot only if they are not in conflict). Once all of the permutations have been evaluated, only those having the maximum number of allocated resources and the maximum number of requests to which at least one resource has been allocated are retained as candidates. Once the allocation has been calculated on a sufficient number of groups of T time slots, the algorithm calculates a shorter pattern to transmit to the group master transceivers. This shorter message is either slot_threshold=0, the variable which must take as a value the number of time slots on the basis of which the allocator has allocated at least one resource to each request, or slots_pattern_starting_slot and slots_pattern_ending_slot, which are the variables which take the values of the first and last time slots respectively to be used in the long pattern to define the short pattern to distribute to the group masters of the network.

The method is based on an iterative processing which calculates an allocation of a large number of time slots.

WHILE the length of the allocation pattern is less than the target length, DO
    Use the EVALUATION OF THE PERMUTATIONS OF T SLOTS step.
    Use the SELECTION OF THE PERMUTATION OF T SLOTS step.
    Update the allocation data for the T current time slots on the basis of the selected permutation.
    IF slot_threshold is zero AND at least one resource has been allocated to each request, THEN
        Position slot_threshold at the current length of the allocation pattern.

These steps shorten the long allocation pattern previously calculated to generate a short pattern to distribute to the group master transceivers of the network. The principal is that, on the basis of an initial length, the more the pattern lengthens, the more the maximum cost associated with the requests on this pattern decreases. These steps end when this maximum cost no longer decreases significantly.

Use the CALCULATION OF THE ALLOCATION PATTERN step.

EVALUATION OF THE PERMUTATIONS OF T SLOTS step

These steps evaluate the different permutations of time slots which exist over a length of T time slots.

Arrange the requests in descending order of the values of their cost function.

Initialize to zero the maximum number of allocated resources for one permutation.

Initialize to zero a table which will contain the number of allocated resources for each permutation.

Initialize to zero the maximum number of fulfilled requests for one permutation.

Initialize to zero a table which will contain the number of requests fulfilled for each permutation.

FOR each permutation of the T time slots, DO
    The updates of the allocations of time slots to requests and the cost function values are valid only in the context of the permutation concerned. They will become final only for the permutation that will be selected at the end of the loop.
    FOR each time slot of the permutation, DO
        FOR each resource request, DO
            Calculate the cost function value associated with the current request if the time slot concerned is allocated to it.
        Arrange the requests in descending order of the values of their cost function.
        Determine the real number of the time slot concerned.
        FOR each resource request (considered in descending order of the cost function values), DO
            IF free frequency channels remain on the time slot concerned, THEN
                IF the time slot concerned is already allocated (if so, it is necessarily on a different frequency channel) to a different conflicting request, THEN
                    IF no time slot has yet been allocated to the current request, THEN
                      This step prioritizes the requests that do not yet have any resource that has been allocated to them. Decrement by 1 the value D(i) of the current request.
                IF NOT, THEN
                    Allocate the first available channel on the time slot concerned to the current request.
                    Increase by 1 the number of allocated resources for the current permutation.
                IF NOT, THEN
                    IF no time slot has yet been allocated to the current request, THEN
                      Decrement by 1 the value D(i) of the current request.
    If necessary, update the number of allocated resources for one permutation. Record the number of requests fulfilled by the current permutation. If necessary, update the number of requests fulfilled for one permutation.
    This test below is a calculation time optimization.
    IF the number of usable channels per time slot is the same for all time slots, THEN
        Leave the loop FOR.

SELECTION OF THE PERMUTATION OF T SLOTS step

Each permutation having been evaluated, the best must now be selected. The process entails two steps.

FOR each of the permutations of T time slots, DO
    In a first iteration, only the permutations having both the maximum allocated resources and the maximum fulfilled requests are selected.
    IF the current permutation fulfils the maximum number of requests AND if the number of resources allocated for the current permutation is the maximum, THEN
        Keep the current permutation for the second step of selection of the permutations.

Consider permutation_1 as the first of the permutations of T time slots selected in the first step.

Initialize selected_permutation to the value permutation_1.

Remove permutation_1 from the list of the permutations of T time slots selected in the first step.

WHILE the list of the permutations of T time slots selected in the first step is not empty, DO
    Consider permutation_2 as the first of the permutations of T time slots selected in the first step.
    Remove permutation_2 from the list of the permutations of T time slots selected in the first step.
    FOR each request (taken in descending order of the values of their cost function), request_1 considered in the permutation permutation_1, DO
        It is assumed that request_2 is the request of the same order in the permutation permutation_2 as request_1 in the permutation selected_permutation.
        IF the cost function value of the request request_2 is lower than the cost function value of the request request_1, THEN
            Assign the value permutation_2 to selected_permutation.
            Leave the loop FOR.
        IF NOT, if the values are equal, THEN
            Keep the current value of selected_permutation.
            Move on to the next iteration of the loop POUR.
        IF NOT, THEN
            Keep the current value of selected_permutation.
            Leave the loop FOR.

The selected permutation is selected_permutation.

CALCULATION OF THE ALLOCATION PATTERN step

These steps generate a short pattern to distribute to the group masters of the network.

Position slots_pattern_starting_slot at the value 2*slot_threshold.

Position slots_pattern_ ending_slot at the value slots_pattern_starting_slot+T−1.

Initialize to zero the maximum cost metric previous_max_cost.
Initialize to zero the maximum cost metric max_cost.
LOOP INDEFINITELY
    FOR each of the resource requests i, DO
        FOR each pair of successive time slots ($slot_1$, $slot_2$) with $slot_1 \geq slots\_pattern\_starting$ and $slot_2 \leq slots\_pattern\_ending\_slot$, DO
            Calculate the cost cost=($slot_2$−$slot_1$)/D(i).
            IF cost>max_cost, THEN
                max_cost=cost
        Calculate the cost loop_cost between the last and first time slots allocated to the request i.
        IF loop_cost>max_cost, THEN
            max_cost=loop_cost
    IF the previous_max_cost/max_cost $\epsilon [0.99, 1.01]$, THEN
        Leave the infinite loop.
    IF NOT
        Increment slots_pattern_ending_slot by T.
        Assign the value of max_cost to previous_max_cost.

At the end of these steps, the calculated pattern is the pattern included between the time slots slots_pattern_starting_slot and slots_pattern_ending_slot.

The method of allocation of the resources by the group master transceiver is carried out in one embodiment in the following manner:

The group master transceiver takes as the input datum the allocation pattern defined by the central transceiver and deducts an allocation pattern from it as indicated in the preceding section. Among the resources included in this pattern, some are marked as low-latency. Prior to any allocation, all of these resources are considered as fulfilling a notional request.

The algorithm considers two types of requests: large time slot requests and mini-time-slot requests.

In a first large loop, for each request except the notional request, a search is first carried out for a free resource (mini-time-slot or time slot according to the request type), then, if this is impossible, an attempt is made to retrieve a resource (mini-time-slot or time slot according to the request type) to the detriment of a different request (except the notional request). At most one single mini-time-slot resource is allocated per time slot to each mini-time-slot request.

In a second large loop, a very similar processing is carried out, except that: (1) the resources concerned are mini-time-slot resources only, which may equally well be allocated to mini-time-slot requests and to large time slot requests; (2) the time slot resources allocated during the first large loop are excluded from the retrieval. The condition according to which only one single mini-time-slot per time slot can be allocated to a mini-time-slot request continues to apply.

In the third and final large loop, the same processing is carried out as in the second large loop, except that: (1) all the resources allocated during the first two large loops are excluded from the retrieval; (2) within the same large time slot, a plurality of mini-time-slots can now be allocated to one mini-time-slot request.

In the following steps, as soon as an allocation has been carried out (whether it be a time slot or mini-time-slot), all of the requests are arranged in ascending order of their cost function and the current iteration of the large loop currently being carried out (1, 2 or 3) ends.

The following definitions are used:
    Nresource: total number of mini-time-slots
    kalloc: total number of large time slots
    Ngroup: number of requests
    D(i): number of time slots required for the request i
    Koeff(i)=1/D(i)
    Alloc(i, kr, k): the value of Alloc(i, kr, k) indicates the channel (none if value zero) allocated to the request i on the mini-time-slot number kr in the repetition k of the pattern defined by the central transceiver
    A(i, k): is equal to 1 if the request i is compatible with the large time slot k
    Conflict(i, j): is equal to 1 if the requests i and j are in conflict
    excluded (time slot, channel): is equal to 1 if the resource (time slot, channel) is excluded from the allocation
    minislot(i): indicates whether the request i requires a mini-time-slot (1) or an entire time slot (4)
    Salloc(i) indicates the number of mini-time-slots allocated to the request i The method uses two cost functions f1 and f2 defined below:

In the first large loop of the algorithm, the function f1( ) is used. It is defined as follows:
    If Salloc(i)=0, then f1(i)=0.
    If not, f1(i)=(Salloc(k)−minislot(k))/minislot(k)*Koeff(k)+$\frac{1}{1000}$
    If f1(i)<$\frac{1}{1000}$, then f1(i)=$\frac{1}{1000}$ The division by minislot(k) means that, as far as the cost function value is concerned, allocating 1 time slot (=4 mini-time-slots) to a time slot request is equivalent to allocating one mini-time-slot to one mini-time-slot request.

The function f2( ) is used in the second large loop of the algorithm. It is defined as follows:
    If Salloc(i)=0, then f2(i)=0.
    If not, f2(i)=(Salloc(k)−1)/minislot(k)*Koeff(k)+$\frac{1}{1000}$
    If f2(i)<$\frac{1}{1000}$ then f2(i)=$\frac{1}{1000}$ The difference between f1( ) and f2( ) applies in the replacement of the value minislot(k) by the constant 1. This allows the allocation of a mini-time-slot to a large time slot request to count less than the allocation of a mini-time-slot to a mini-time-slot request.

Main Steps of the Method
LARGE LOOP 1 step
    While at least one time slot or mini-time-slot resource has been allocated or reallocated in the preceding iteration of the LARGE LOOP 1, then attempt to allocate a resource to a request (While convergence=0)
        While there are still requests to be evaluated (the notional request is ignored, the requests are considered one after the other, in ascending order of their cost function f1( ).) and no time slot has been allocated to the current request (While test2=0 And I1<Ngroup)
            Invoke LOOP 1 SEARCH FOR FREE RESOURCE step
            If no resource has been allocated during the LOOP 1 SEARCH FOR FREE RESOURCE step, an attempt must then be made to retrieve a resource to the detriment of a different request
            Use the LOOP 1 RESOURCE RETRIEVAL step
    Mark all the resources allocated to the large time slot requests as being excluded from the retrieval
    Arrange the requests in ascending order of their cost function f2( )
LARGE LOOP 2 step
    While at least one mini-time-slot resource has been allocated or reallocated in the preceding iteration of the LARGE LOOP 2, then attempt to allocate a resource to a request (While convergence=0)

While there are still requests to be evaluated (the notional request is ignored, the requests are considered one after the other, in ascending order of their cost function f2( ).) and no mini-time-slot has been allocated to the current request (While test2=0 And 11<Ngroup)
    Use the LOOP 2 SEARCH FOR FREE MINI-SLOT RESOURCE step
    If no resource has been allocated during the LOOP 2 SEARCH FOR FREE MINI-SLOT RESOURCE step, an attempt must then be made to retrieve a resource to the detriment of a different request.
        Use the LOOP 2 RETRIEVAL OF MINI-SLOT RESOURCE step
Mark all the resources allocated during the processing operations carried out during the LARGE LOOP 1 step and the LARGE LOOP 2 step as being excluded from the retrieval
Arrange the requests in ascending order of their cost function f2( )
LARGE LOOP 3 step
    While at least one mini-time-slot resource has been allocated or reallocated in the preceding iteration of the LARGE LOOP 3, then attempt to allocate a resource to a request (While convergence=0)
        While there are still requests to be evaluated (the notional request is ignored, the requests are considered one after the other, in ascending order of their cost function f2( ).) and no time slot has been allocated to the current request (While test2=0 And 11<Ngroup)
            Use the LOOP 3 SEARCH FOR MINI-SLOT RESOURCE step
            If no resource has been allocated during the LOOP 3 SEARCH FOR FREE MINI-SLOT RESOURCE step, an attempt must then be made to retrieve a resource to the detriment of a different request.
                Use the LOOP 3 RETRIEVAL OF MINI-SLOT RESOURCE step
LOOP 1 SEARCH FOR FREE RESOURCE step
    Search for a free resource (the large time slots are considered one by one, from the large time slot offset by a constant (for example 7) in relation to the last large time slot allocated to the current request.) (While test3=0 And kb<kalloc)
        If the current request is a large time slot request (If mini-time-slot(i)=4 Then)
            Check that the following conditions are fulfilled:
                the large time slot is compatible with the current request (A(i, kr)=1)
                the large time slot is not already allocated to the current request (Alloc(i, krs, k)=0)
                no request in conflict with the current request has any resource within the large time slot
                a free channel remains on the large time slot and on each of the mini-time-slots of the large time slot
            If these conditions are verified (If test4=0 And channel>0 Then):
                Allocate the 4 mini-time-slots to the current request
                Arrange the requests in ascending order of their cost function f10
        If the current request is a mini-time-slot request (If minislot(i)=1 Then)
            Check that the following conditions are fulfilled:
                in the current large time slot, no mini-time-slot is already allocated to the current request
                the large time slot is compatible with the current request
            LOOP MINI-SLOT 1 step
                If all these conditions are verified, then consider the mini-time-slots one by one until a resource is allocated to the current request (While imini<4 And testmini=0)
                    Check that the following conditions are fulfilled:
                        no request in conflict with the current request has any resource on the mini-time-slot
                        a free channel remains on all the mini-time-slots of the large time slot
                  If these conditions are verified (If test4=0 And channel>0 Then):
                      Allocate to the current request the mini-time-slot on the first free channel on all the mini-time-slots of the large time slot
                      Arrange the requests in ascending order of their cost function f1( )
                If no allocation of a mini-time-slot to the current request has been carried out, then (If testmini=0 Then)
                LOOP MINI-SLOT 2 step
                    Carry out the same processing as in the LOOP MINI-SLOT 1 but by accepting to allocate a channel on a mini-time-slot even if this channel is not free on all the mini-time-slots of the large time slot.
LOOP 1 RESOURCE RETRIEVAL step
    Search for a resource to retrieve (the large time slots are considered one by one, from the large time slot offset by a constant (for example 7) in relation to the last large time slot allocated to the current request.) (While test3=0 And kb<kalloc)
        By default, the resource concerned is retrievable.
        If the current request is a large time slot request (If mini-time-slot(i)=4 Then)
            Check that the following conditions are fulfilled:
                the large time slot is compatible with the current request (A(i, kr)=1)
                the large time slot is not already allocated to the current request (Alloc(i, krs, k)=0)
            If all these conditions are verified, then consider one by one the 4 mini-time-slots of the large time slot
                Check whether a request j having a channel which is allocated to it and which is in conflict with the current request i exists on the current mini-time-slot. If so, and if either ((f1(i, n−1)>f1(j, n)) or (f1(i, n+1)=f1(j, n) and i>j) or that the pre-emption to the benefit of i to the detriment of j is excluded, then no channel retrieval is possible on the large time slot.
        If it is possible to retrieve a channel on the large time slot resource, then (If test4=0 Then)
            Search for the request to the detriment of which the resource will be retrieved
                Allocate all the mini-time-slots on the selected channel to the current request
                De-allocate the appropriate resources:
                    For the requests in conflict with the current request, all the channels allocated on all the mini-time-slots of the large time slot
                    For the requests not in conflict with the current request, only the channel that has been retrieved, on all the mini-time-slots of the large time slot
            Arrange the requests in ascending order of their cost function f10
        If the current request is a mini-time-slot request (If mini-time-slot(i)=1 Then)

Check that the following conditions are fulfilled:
  in the current large time slot, no mini-time-slot is already allocated to the current request
  the large time slot is compatible with the current request
LOOP MINI-SLOT 3 step
If all these conditions are verified, then consider one by one the 4 mini-time-slots of the large time slot until a resource has been able to be allocated to the current request to the detriment of a different request (While imini<4 And testmini=0)
  Check whether a request j having a channel which is allocated to it and which is in conflict with the current request i exists on the current mini-time-slot. If so, and if either ((f1(i, n+1)>f1(j, n)) or (f1(i, n+1)=f1(j, n) and i>j) or that the pre-emption to the benefit of i to the detriment of j is excluded, then no channel retrieval is possible on the current mini-time-slot.
  If it is possible to retrieve a channel on the mini-time-slot resource, then (If test4=0 Then)
    Search for the request to the detriment of which the resource will be retrieved, allocate the mini-time-slot on the selected channel to the current request
    De-allocate the appropriate resources
      For each request in conflict with the current request:
        If the request is a large time slot request, all its channels on all the mini-time-slots of the large time slot
        If the request is a mini-time-slot request, its channel on the mini-time-slot reallocated to the current request
      For each request not in conflict with the current request:
        If the request is a large time slot request, only the channel which has been retrieved on all the mini-time-slots of the large time slot
        If the request is a mini-time-slot request, only the channel which has been retrieved on the mini-time-slot reallocated to the current request
      Arrange the requests in ascending order of their cost function f1( )
LOOP 2 SEARCH FOR FREE MINI-SLOT RESOURCE step
  Search for a free resource (the large time slots are considered one by one, from the large time slot offset by a constant (for example 7) in relation to the last large time slot allocated to the current request) (While test3=0 And kb<kalloc)
    Consider one by one the mini-time-slots of the large time slot (While imini<4 And testmini=0)
      Check that the following conditions are fulfilled:
        there is at least one non-excluded channel on the current mini-time-slot
        the current request if it is a mini-time-slot request not already having a channel on one of the mini-time-slots of the large time slot
        the large time slot is compatible with the current request (A(i, kr)=1)
        the mini-time-slot is not already allocated to the current request (Alloc(i, krs, k)=0)
      If all these conditions are fulfilled, then
        Check that the following conditions are fulfilled:
          there is a free channel on the mini-time-slot
          no request in conflict has a channel on the mini-time-slot
        If these two conditions are verified, then (If test4=0 And channel>0 Then)
          Allocate the current mini-time-slot to the current request on the first free channel
          Arrange the requests in ascending order of their cost function f2( )
LOOP 2 RETRIEVAL OF MINI-SLOT RESOURCE step
  Search for a resource to retrieve (the large time slots are considered one by one, from the large time slot offset by a constant (for example 7) in relation to the last large time slot allocated to the current request.) (While test3=0 And kb<kalloc)
    By default, the resource concerned is retrievable.
    Consider one by one the mini-time-slots of the large time slot (While imini<4 And testmini=0)
      Check that the following conditions are fulfilled:
        there is at least one non-excluded channel on the current mini-time-slot
        the current request if it is a mini-time-slot request not already having a channel on one of the mini-time-slots of the large time slot
        the large time slot is compatible with the current request (A(i, kr)=1)
        the mini-time-slot is not already allocated to the current request (Alloc(i, krs, k)=0)
      If all these conditions are verified, then check whether a request j having a channel which is allocated to it and which is in conflict with the current request i exists on the current mini-time-slot. If so, and if either ((f2(i, n+1)>f2(j, n)) or (f2(i, n+1)=f2(j, n) and i>j) or that the pre-emption to the benefit of i to the detriment of j is excluded, then no channel retrieval is possible on the current mini-time-slot.
      If it is possible to retrieve a channel on the mini-time-slot resource, then (If test4=0 Then)
        Search for the request to the detriment of which the resource will be retrieved
        Allocate the mini-time-slot on the selected channel to the current request
        De-allocate the appropriate resources:
          For each request in conflict with the current request, its channel on the mini-time-slot reallocated to the current request
          For each request not in conflict with the current request, its channel only if it is the channel that has been reallocated to the current request
        Arrange the requests in ascending order of their cost function f2( )
LOOP 3 SEARCH FOR FREE MINI-SLOT RESOURCE step
  This procedure is identical to the LOOP 2 SEARCH FOR FREE MINI-SLOT RESOURCE step, except that the condition which limits the allocation to a request for one mini-time-slot per large time slot is no longer verified
LOOP 3 RETRIEVAL OF MINI-SLOT RESOURCE step
  This procedure is identical to the LOOP 2 RETRIEVAL OF FREE MINI-SLOT RESOURCE step, except that the condition which limits the allocation to a request for one mini-time-slot per large time slot is no longer verified In one embodiment, some time slots are divided into a plurality of time sub-slots (one advantageous division may be to divide the time slots into four time sub-slots). The second device 102 or the third device 103 are suitable for using these time sub-slots. The configuration of the time slots that can be divided up is carried out during a step which precedes the use of the system or during the use of the system. This division of the time slots enables the transmission of data requiring a low rate and low latency. These types of data are, for example, signaling data or real-time data. However, it is necessary to process these two types of data differently, whereby the signaling data transmission is continuous, whereas the real-time data transmission is activated on demand. Therefore, as a result, when the transmission of real-time data is not activated, the time sub-slots are available for the transmission of other types of data. The third device 103 may not be authorized to use a time sub-slot allocated to a group which coincides temporally with a different time slot containing second time sub-slots if radio transceivers of the group take part in an exchange of data using one of these second time sub-slots. In order to avoid a large number of pre-emptible time sub-slots being assigned to the same group, the second device does not allocate consecutive time sub-slots to the same group. If it has not been possible to allocate some of the time sub-slots to real-time data, they can be used for the transmission of other types of data.

In one embodiment, a sixth device enables storage of the resources usable by radio transceivers of the group. Moreover, in this embodiment, the second and third allocation devices are suitable for allocating resources to a radio transceiver or a group only if the resource is indicated as being usable by the radio transceiver or the group. This embodiment allows a possible split of the network into two independent networks to be managed, and interference between these two independent networks then to be avoided.

The invention claimed is:

1. A communication resource allocation system implemented in a mobile meshed network, the system allocating resources including a time slot and at least one associated channel including at least one transmit and/or receive frequency usable during the time slot, the mobile meshed network comprising:
  a first set of radio transceivers communicating with one another via radio links,
  at least one group of transceivers, comprising a second set of at least one radio transceiver of said first set, said second set including a master transceiver in a master/subordinate relationship with all the radio transceivers of the second set; and
  a central radio transceiver of the network belonging to said first set, wherein said system is configured to:
    determine the at least one group of transceivers,
    allocate at least some of said resource to the at least one group of transceivers:
      through assignment of a resource to a single group of transceivers, for communications between radio transceivers of said group; and
      through assignment of a resource to a single first group of transceivers, for communications between radio transceivers of said first group and radio transceivers belonging to one or more first destination groups of transceivers, when no other resource sharing a same time slot with said resource is allocated to:
        one of said first destination groups of transceivers, second groups of transceivers for communications between radio transceivers of said second groups and radio transceivers belonging to one or more second destination groups, the first group and the second groups of transceivers having a common radio neighbor in a group that is a destination group for both of said first and second groups, and
        second groups of transceivers for communications between radio transceivers of said second group and radio transceivers of said first group;
    allocate, for the at least one group of transceivers, at least some of the resources allocated to the at least one group of transceivers to the radio transceivers of the group.

2. The system as claimed in claim 1, wherein allocating at least some of the resources to the at least one group of transceivers comprises:
  initializing a priority index associated with each respective group of transceivers on a basis of:
    a number of radio transceivers belonging to the respective group,
    a number of radio transceivers belonging to neighboring groups of transceivers; and
    requirements for resources necessary for the radio transceivers belonging to the group,
  assigning a resource to a first group of transceivers having the lowest priority index and being able to use said resource for communication between the radio transceivers of the first group of transceivers,
  assigning a resource to the first group of transceivers having the lowest priority index and being able to use said resource for communication between radio transceivers of the first group of transceivers and radio transceivers belonging to one or more neighboring destination groups of transceivers, if none of the other resources sharing the same time slot with said resource is determined as belonging to one of the neighboring destination groups or to a different second group of transceivers for links to one of said neighboring destination groups of the first group, except possibly if the first group and the second group have no transceiver having a common radio neighbor belonging to one of the destination groups; and
  updating the priority index following a resource assignment.

3. The system as claimed in claim 1, wherein: determining the at least one group of transceivers comprises determining said central radio transceiver, said system further configured to:
  transmit, for at least some of the radio transceivers of each group of transceivers, required resources to the master transceiver, said master transceiver performing concatenation of the required resources received, and transmitting said concatenated required resources to the central radio transceiver; and
  transmit, from the central radio transceiver to all of the master transceivers, a list of the resources allocated to the groups of transceivers, and from each of the master transceivers to the radio transceivers of each group of transceivers, a list of the resources allocated to the radio transceivers.

4. The system as claimed in claim 1, wherein allocating at least some of the resources to the groups of transceivers or allocating at least some of the resources allocated to groups of transceivers to radio transceivers of the group comprises dividing the time slots into time sub-slots and assigning the time sub-slots to radio transceivers which are different or to groups of transceivers which are different.

5. The system as claimed in claim 1, the system further configured to store, for at least some of the radio transceivers and groups of transceivers, an authorization of use by the radio transceiver or by the group at least some available resources;

wherein allocating at least some of the resources allocated to groups to radio transceivers of the group further comprises not assigning a resource to a radio transceiver or to a group of transceivers upon a determination that said radio transceiver or said group is not authorized to use said resource.

6. A communication resource allocation method, implemented in a mobile meshed network, for allocating a resource including a time slot and at least one associated channel including at least one transmit or receive frequency usable during said time slot; the mobile meshed network comprising:
- a first set of radio transceivers communicating with one another via radio links,
- at least one group of transceivers, comprising a second set of at least one radio transceiver of said first set, said second set including a master transceiver in a master/subordinate relationship with all the radio transceivers, and
- a central radio transceiver of the network belonging to said first set of radio transceivers, wherein said method comprises:
- a first step of determining the at least one group of transceivers,
- a second step of allocating all or some of said resources to the at least one group of transceivers:
  - through assignment of a resource to a single group of transceivers for communications between radio transceivers of said group of transceivers; and
  - through assignment of a resource to a single first group of transceivers for communications between radio transceivers of said first group and radio transceivers belonging to one or more first destination groups of transceivers, when no other resource sharing the same time slot with said resource is allocated to:
    - one of said first destination groups of transceivers,
    - second groups of transceivers for communications between radio transceivers of said second group and radio transceivers belonging to one or more second destination groups of transceivers, the first group and the second groups of transceivers having a common radio neighbor in a group that is a destination group for both of said first and second groups, and
    - second groups of transceivers for communications between radio transceivers of said second group and radio transceivers of said first group;
- a third step of allocating, for at least one the group of transceivers, at least some of the resources allocated to each group of transceivers to the radio transceivers of the group.

* * * * *